Dec. 23, 1947.  H. W. HAPMAN  2,433,274
TROLLEY CONVEYOR OF THE BUCKET TYPE
Filed Nov. 1, 1944  3 Sheets-Sheet 1
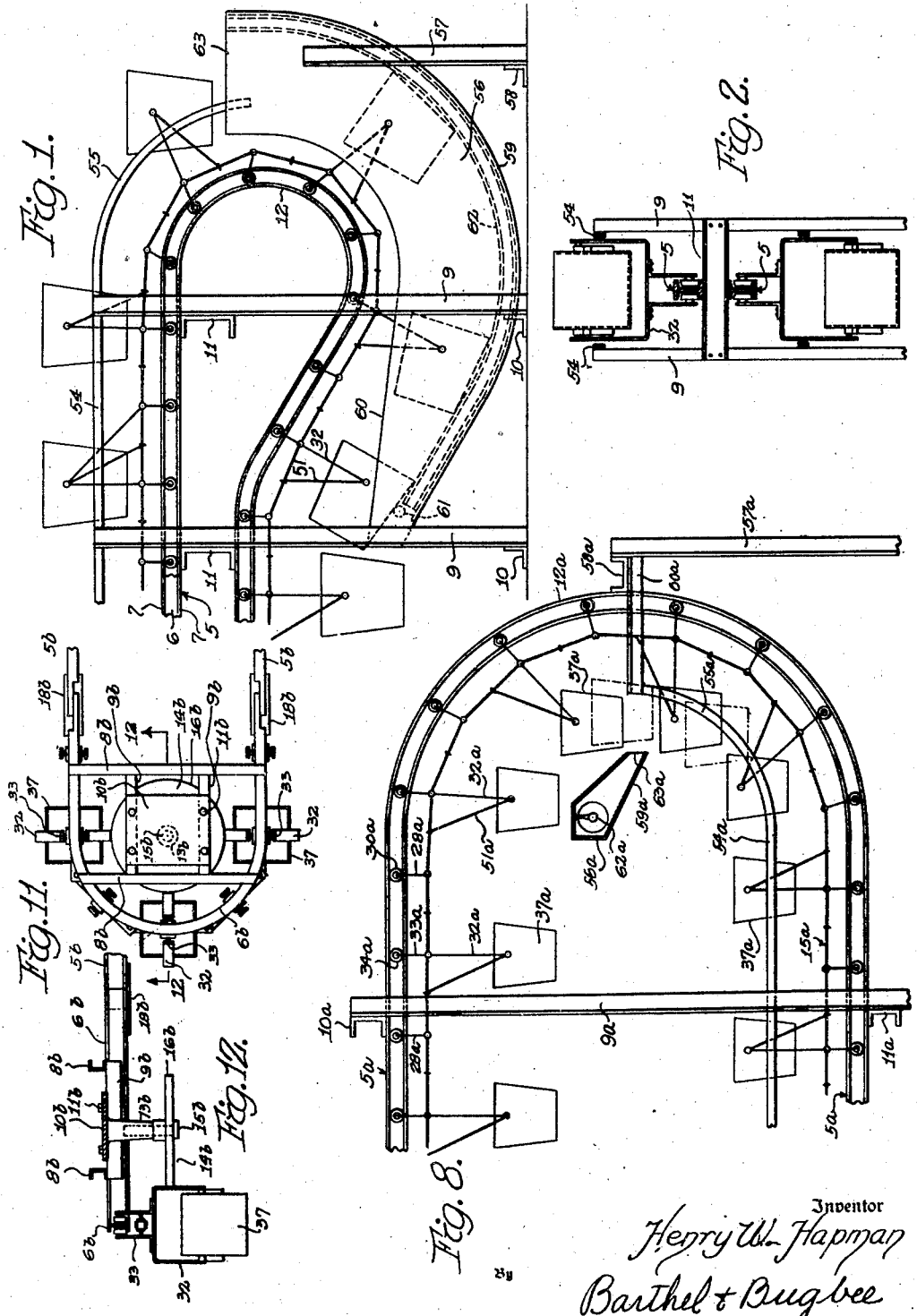
Inventor
Henry W. Hapman
By Barthel & Bugbee
Attorneys Dec. 23, 1947.　　　H. W. HAPMAN　　　2,433,274
TROLLEY CONVEYOR OF THE BUCKET TYPE
Filed Nov. 1, 1944　　　3 Sheets-Sheet 2
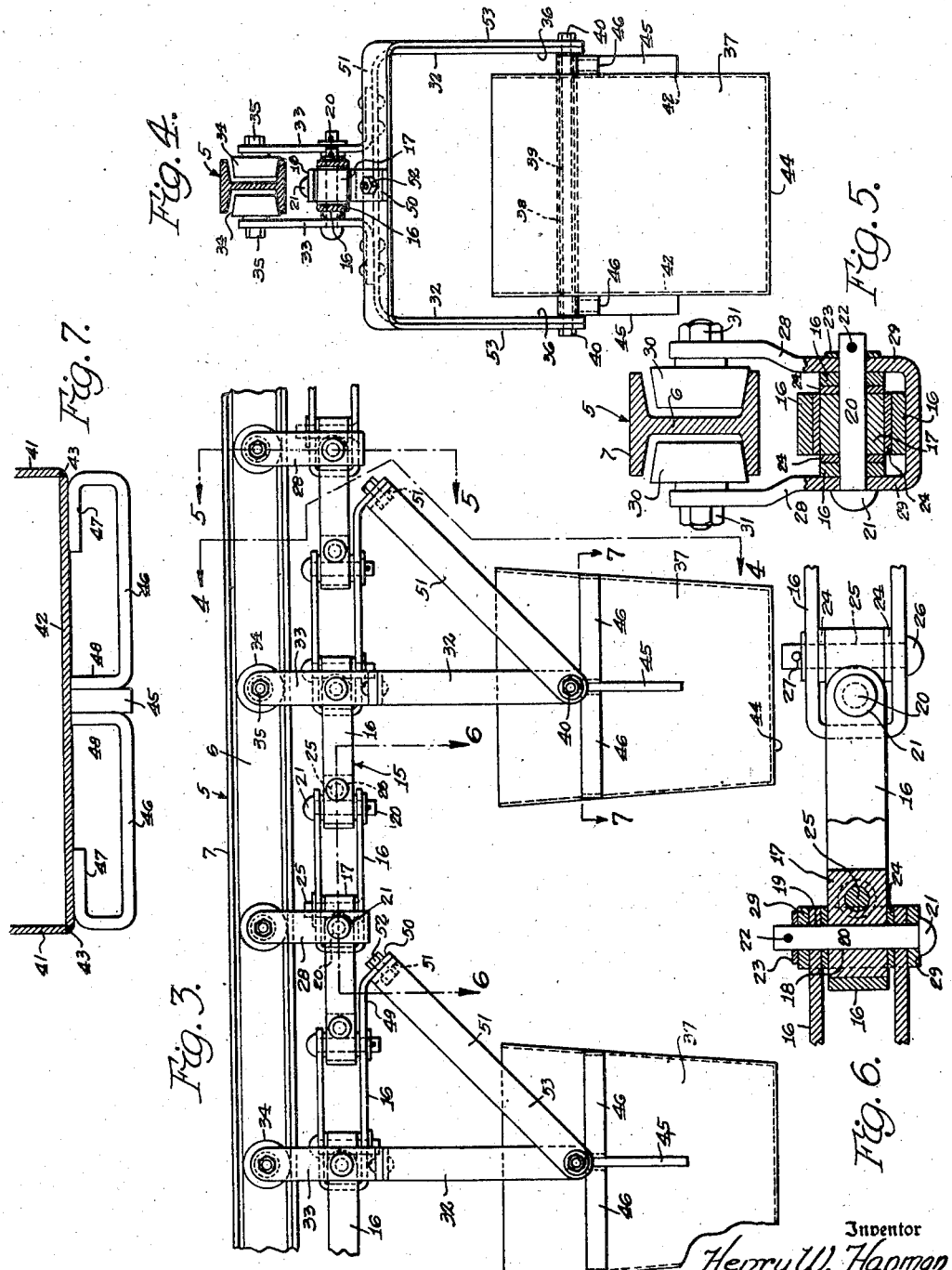
Inventor
Henry W. Hapman
By Barthel & Bugbee
Attorneys

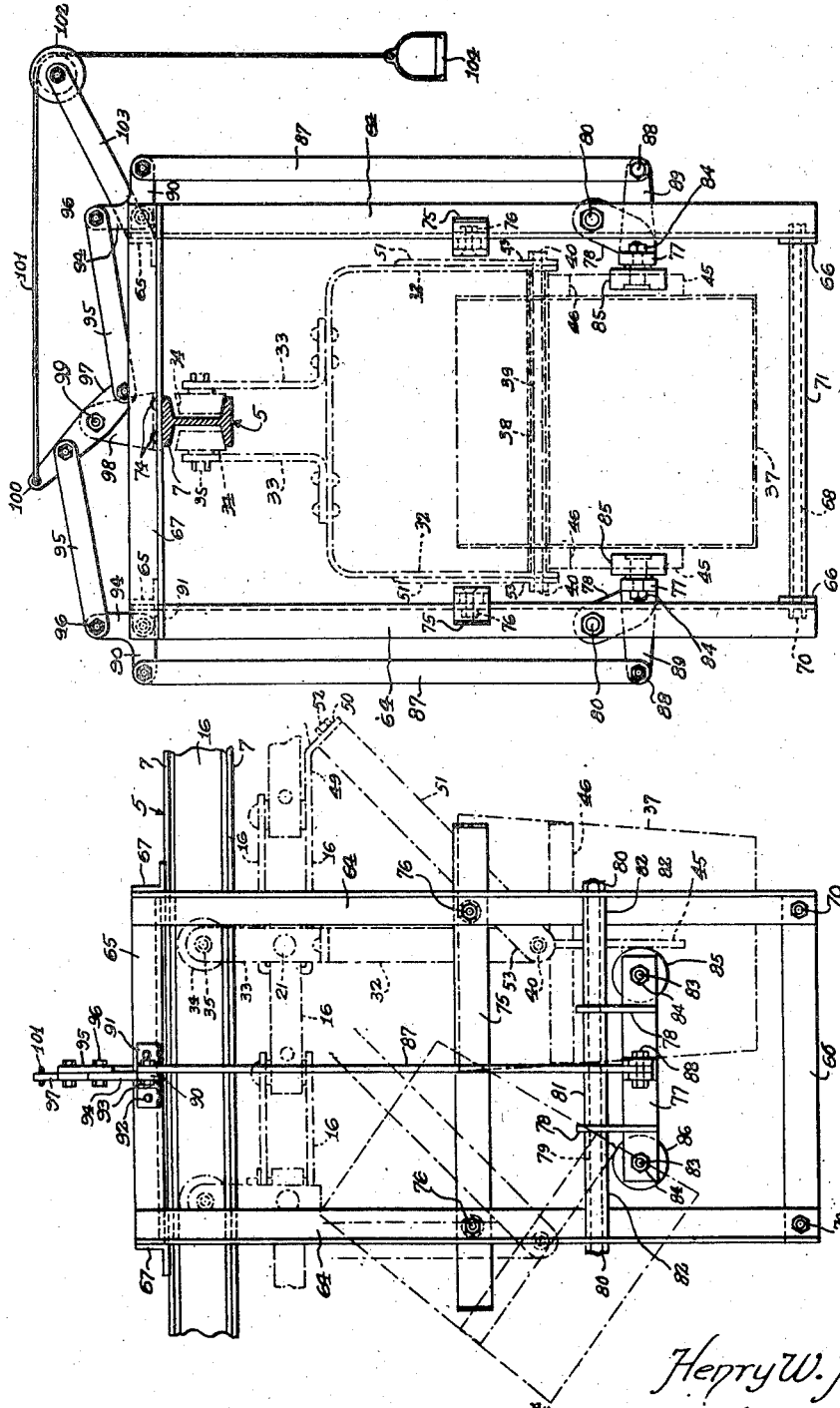

Patented Dec. 23, 1947

2,433,274

UNITED STATES PATENT OFFICE 2,433,274

TROLLEY CONVEYOR OF THE BUCKET TYPE

Henry W. Hapman, Detroit, Mich.

Application November 1, 1944, Serial No. 561,409

13 Claims. (Cl. 198—148)

The present invention relates to improvements in trolley conveyors, and more particularly, to a trolley conveyor of the pivoted bucket type.

The primary object of the invention is to provide a trolley conveyor in which the pivoted buckets are suspended in such a manner as to project from said conveyor trolley in all positions of conveyor travel, whereby said buckets will be supported in spaced relation from the conveyor trolley and will not be obstructed or interrupted in their conveyor travel thereby.

Another object of the invention is to provide a trolley conveyor in which the conveyor buckets are supported from a trolley beam and held in an extended position relative thereto so that the conveyor buckets will travel in a circuitous pathway in an upright position.

Another object of the invention is to provide a trolley conveyor structure in which the trolley beam may be arranged in a circuitous pathway with the conveyor runs in a horizontal or perpendicular plane so that the conveyor may be adapted to a wide variety of uses and materials.

Another object of the invention is to provide a trolley conveyor of the above-mentioned type which is provided with an endless conveyor chain or other flexible drive member to which the conveyor buckets are connected in spaced apart relation whereby the conveyor buckets will be moved about a circuitous pathway and be maintained in their spaced relation as well as being held extended from the conveyor trolley.

Another object of the invention is to provide a trolley conveyor of the above-mentioned character in which the conveyor chain or flexible drive member is constructed and arranged so as to flex in horizontal and vertical directions whereby said conveyor buckets may be propelled and supported on a conveyor trolley having the runs thereof supported in both planes of conveyor chain flexing to thereby permit material to be conveyed vertically as well as horizontally along said conveyor circuit or pathway.

Another object of the invention is to provide a trolley conveyor having a series of conveyor buckets which are uniquely constructed and supported from the conveyor trolley by means of bail members so arranged and affixed to the endless conveyor chain as to maintain a rigid connection therewith and prevent said buckets from falling toward the conveyor chain when the buckets are traversing the upper conveyor run.

Another object of the invention is to provide a trolley conveyor of the pivoted bucket type having guide means for the buckets to maintain said buckets perpendicular during the course of their travel along certain conveyor runs so that the buckets will not fall laterally and downwardly by gravity.

Another object of the invention is to provide a trolley conveyor of the pivoted bucket type with loading means to facilitate the loading of the conveyor buckets while traversing the ends of the conveyor trolley runs.

Another object of the invention is to provide a trolley conveyor of the pivoted bucket type in which the buckets are adapted to be tripped at certain locations along the path of conveyor travel to thereby cause said buckets to be tilted and the material therein discharged from said buckets.

Another object of the invention is to provide a trolley conveyor of the pivoted bucket type in which the buckets may be emptied or discharged by being tilted or rocked about the axis of their pivotal point at certain locations along the conveyor pathway by means of tripping devices conveniently positioned and supported from the conveyor trolley.

Another object of the invention is to provide a trolley conveyor of the above-mentioned type in which the tripping devices may be manually controlled to be placed in their operative position as desired by manipulating a suitable control element remotely located relative to the trolley conveyor.

Another object of the invention is to provide a trolley conveyor of the pivoted bucket type in which the buckets are provided with tripping projections and flanges to facilitate the dumping of the buckets at certain locations along the conveyor pathway by tilting and rocking said buckets on their axis of pivotal connection when said projections and flanges thereon engage the tripping device positioned on said conveyor pathway and cause the buckets to be completely inverted and dumped.

Other objects and advantages of the invention will become apparent during the course of the following description of the accompanying drawings wherein:

Figure 1 is a fragmentary side elevational view of the trolley conveyor embodying the invention and showing the manner in which the buckets are loaded during the traversal at the end of the circuitous conveyor pathway;

Figure 2 is a vertical sectional view of the trolley conveyor shown in Figure 1 and illustrating the manner in which the conveyor buckets are guided and supported during a portion of their travel;

Figure 3 is an enlarged side elevational view of the conveyor structure showing the manner in which the buckets are pivoted and suspended from a trolley beam by a suitable bail member;

Figure 4 is a vertical cross sectional view taken on the irregular line 4—4 of Figure 3 looking in the direction of the arrows and illustrating structural details of the trolley conveyor and the means for supporting, suspending and driving said buckets;

Figure 5 is a vertical cross-sectional view taken on line 5—5 of Figure 3 looking in the direction of the arrows further illustrating the structural arrangement of the conveyor chain supporting members alternately arranged between the conveyor bucket supporting bails;

Figure 6 is a horizontal cross-sectional view taken on line 6—6 of Figure 3 looking in the direction of the arrows and illustrating the various structural details of the flexible endless conveyor drive member;

Figure 7 is a horizontal cross-sectional view taken on line 7—7 of Figure 3 looking in the direction of the arrows and illustrating structural details of the conveyor buckets and the arrangement of the tripping flanges and guides on the sides thereof;

Figure 8 is a fragmentary side elevational view of a modified form of the invention showing the manner in which the trolley beam can be arranged so that the buckets will travel along a conveyor pathway within the confines of said trolley beam;

Figure 9 is a side elevational view of a tripping device which may be installed at various locations in the circuitous pathway of the trolley beam shown in both forms of the invention for the purpose of automatically tripping, dumping and inverting the conveyor buckets as they pass a predetermined location so that the conveyor buckets will be completely rocked and rotated to facilitate the discharge of the contents thereof;

Figure 10 is a front elevational view of the tripping device illustrating the position of the bucket-engaging tripping rollers and the manual control means therefor;

Figure 11 is a top plan view of an adjustable take-up guide member for horizontally disposed bends or turns to facilitate the proper movement of the conveyor buckets when travelling about turns in a horizontal plane; and Figure 12 is a vertical cross-sectional view of the combined adjustable take-up and guide member, taken on line 12—12 of Figure 11 and looking in the direction of the arrows to illustrate the manner in which the conveyor buckets are engaged and guided about bends and turns in a horizontal plane.

In the form of the invention shown in Figures 1 to 7, 9 and 10, the reference character 5 will generally be employed to designate a conveyor trolley beam of I-shaped cross section providing a web 6 and opposed flanges 7 (Figure 5). The trolley beam 5 may be arranged in any desired circuitous pathway and, as shown in Figure 1, the trolley beam is positioned so that the conveyor runs are in vertical alignment and are supported by vertical uprights 9 at each side thereof securely anchored to the floor and fastened in place by suitable connecting angle bars 10. The upper ends of the vertical standards 9 are connected by transversely extending channel beams 11 to provide a fabricated trolley conveyor support with certain of the transverse channel beams 11 having their flanges welded or otherwise secured to the trolley beam as indicated in Figures 1 and 2, to securely support said trolley and retain the same in position. The trolley beam may be curved as indicated at 12 to provide a return bend of the desired arc to accommodate the particular conveyor construction desired. If desired, both ends of the circuitous conveyor pathway may be formed as shown in Figure 1, and for a major portion of the circuitous pathway the trolley beam 5 may extend in straight-run parallel portions connecting the return bend at each end thereof, or, if desired, the conveyor trolley beam may be bent in a horizontal plane to negotiate turns or irregular pathways as well as being return bent as shown in Figure 1 in a vertical plane.

The conveyor structure also comprises a conveyor chain generally indicated by the reference character 15 which is comprised of U-shaped conveyor chain links 16 (Figures 3 and 6) arranged alternately at right angles one to the other. Each chain link 16 is provided at its closed end with a pivot block 17 having a bore 18 which is adapted to register with oppositely disposed openings or apertures 19 in the ends of the U-shaped links 16 for the reception of pivot pins 20 having a rounded head at one end as at 21 and a retaining key 22 at the other end. Washers 23 and 24 may be disposed on opposite sides of the chain link ends 16 (Figure 6) to provide thrust bearings for the pivot blocks 17. Transversely extending bolts 25 are provided for retaining the pivot block 17 in the closed or looped ends of the chain links 16, also shown in Figure 6, and said bolts are provided with rounded heads 26 at one end thereof and a retaining pin or the like 27 at the opposite end thereof. It will thus be seen that the chain links 16 are alternately arranged at right angles to one another to permit flexing of the conveyor chain horizontally as well as vertically. This construction accommodates conveyor pathways in which the conveyor buckets travel around vertical bends as well as horizontal bends.

Certain of the pivot pins 20 are provided with trolley supporting clips 28 of U-shaped form which have their closed ends extending about and secured to one of the knuckles of the conveyor chain and fastened thereto by one of the pivot pins 20. The legs 29 of the trolley clips 28 are disposed on opposite sides of the free end of the chain links 16 as illustrated in Figures 3, 5 and 6, to securely anchor said clips in place to the chain and to the pivot pins 20 thereof. The outer washers 23 of the chain link construction are adapted to provide retaining members for the trolley clips 28. The trolley clips 28 have their free ends disposed on opposite sides of the trolley beam 5 and are fitted with conveyor rollers 30 having their short stub shafts threaded and extending through suitable apertures in the ends of the trolley clips 28 so as to be held in position by nuts or the like as at 31. The trolley rollers 30 are disposed on opposite sides of the trolley beam web 6 so as to ride upon the oppositely disposed lower flanges 7 thereof and support said conveyor chain at spaced apart intervals. It is to be noted that the free ends of the chain links 16 which connect with the trolley clips 28 and are pivoted thereto by means of the bolt 20, are arranged so as to permit flexing of the conveyor chain in a vertical plane without causing binding of the conveyor chain when negotiating vertically disposed conveyor bends.

Alternately disposed between pairs of conveyor chain links 16 is a series of conveyor bucket supporting bails, each of which includes a U-shaped bail strap 32 connected to the conveyor chain by means of angle straps 33 and elongated bolts 20 thereof which are substantially the same as the pivot bolts shown in Figures 5 and 6. The upper ends of the angle straps 33 are provided with trolley rollers 34 which have their axles or stub shafts secured in place by nuts or the like as at 35 threaded thereon. The free ends 36 of the bucket bails 32 are adapted to support a conveyor bucket 37 and, as shown in Figure 4, each of the conveyor buckets is provided with a tubular rod 38 extending transversely thereof with the ends welded or otherwise fastened to the side walls of the buckets 37. The ends of the tubular bar 38 are in register with suitable openings in the side walls of the conveyor buckets for receiving a conveyor bucket supporting rod 39, the ends of which project beyond the side walls of the bucket and extend through openings in the free ends 36 of the bucket bails 32 so as to be held in place by nuts or the like as at 40, suitably threaded on the ends thereof. Each of the conveyor buckets 37 is formed rectangular in horizontal cross section and comprises end walls 41 connected by side walls 42 welded or otherwise secured thereto as at 43. A bottom wall 44 completes the bucket structure and provides a conveyor bucket with downwardly sloping end walls and perpendicular or straight side walls. The side walls 42 of each bucket are provided with vertically disposed flanges 45 and horizontally extending tripping wing members which are formed of strap irons 46 which have their outer ends return bent as at 47 for being welded to the side walls of the bucket and their inner ends bent inwardly as at 48 for being welded or otherwise secured to the vertical tripping flanges 45, so that the vertical tripping flanges 45 and tripping wings 46 will cooperate to dump the bucket and completely rotate the same at predetermined locations along the conveyor pathway in a manner which will be hereinafter more fully described.

The conveyor chain links 16 and the knuckles thereof which support the conveyor bucket bails 32 are provided with extensions 49 on one of their legs having the free end thereof bent angularly as at 50 for accommodating the conveyor bucket bracing bail of U-shaped construction. The closed end of the bracing bail 51 is secured to the angular free end 50 of the extension 49 by means of a nut and bolt 52 and the free ends or legs 53 (Figure 4) of the bracing bail 51 are connected to the conveyor bucket supporting rod 39 and held in place by the nuts 40 threaded on each end thereof. The bracing bails 51 prevent the conveyor bucket bails 32 from twisting forwardly or rearwardly during the travel of said buckets around the circuitous conveyor pathway and in order to prevent lateral swinging movement of the buckets, a pair of guide strips 54 (Figures 1 and 2) are secured to the upper end of the vertical standards 9 so as to engage the conveyor bucket bails 32 during the travel of the conveyor buckets along the uppermost conveyor run. It is noted that the guide strips 54 are arcuately curved at the ends as at 55 (Figure 1) so as to engage the conveyor bucket supporting bails 32 adjacent the return bend of the conveyor pathway. Since the conveyor buckets are suspended from the trolley beam along the lowermost conveyor run, no means of additional support is needed and the conveyor buckets are prevented from lateral swinging by their own weight.

In order to load the conveyor buckets, an arcuately curved conveyor bin 56 is mounted adjacent the return bend 12 of the trolley beam 5 and said bin may be formed of sheet metal and supported by the vertical standards 9 as well as an additional vertical standard 57, suitably secured to the floor and anchored in place by a transversely extending angle beam 58. As illustrated in Figure 1, the conveyor bin 56 may be shaped in transverse cross-section to conform to the shape of the bucket and said bin includes a bottom wall 59 which is arcuately curved to conform to the curvature of the return bend 12 so that the side walls 60 thereof will extend upwardly at each edge of the bottom wall 59 and provide a bin for receiving material for being conveyed. As the conveyor buckets 37 enter the bin, they engage a transversely extending bar 61 secured between the side walls 60 and are tilted so that the bucket opening will be presented to the material within the bin 56. In order to prevent the upper edge of the conveyor buckets from wearing and mutilating the floor 59 of the bin 56, an arcuately curved guide beam 62 is secured to said floor centrally thereof so that as the buckets are tripped by the transverse bar 61, the top and bottom edges thereof will be supported on the arcuately curved guide beams 62 and held in spaced relation from the floor 59 of the bin. As the conveyor buckets travel through the bin, they are thus loaded and pass upwardly through the discharge opening 63 of the bin 56 and are thereby engaged by the arcuately curved portions 55 of the guide strips 54. The loaded buckets may then travel along the upper run or conveyor course and will be supported in spaced relation from the trolley 5 and prevented from lateral swinging by the oppositely disposed guide strips 54.

In order to trip the conveyor bucket at any desired location, obstruction devices may be placed in the path of the tripping flanges and wing extensions 45 and 46 respectively, and as shown in Figures 9 and 10, such a tripping device may include a frame structure supported by the trolley beam 5 and suspended therefrom at the desired location. The tripping device comprises a pair of side frame members 64 disposed on opposite sides of the conveyor trolley beam 5 connected at the top and bottom by side bars 65 and 66 respectively and connected transversely by top and bottom connecting bars 67 and 68. The top frame bars 65 and 67 may have their ends welded together or otherwise secured to form a rectangular construction, while the lower side bars 66 are secured in place by the lower transverse bars 68 which are threaded at the ends and extend through suitable apertures for receiving nuts 70 on the threaded ends thereof. A tubular spacing rod 71 surrounds the lower transverse bar or rod 69. The intermediate portion of the upper frame bars 67 is adapted to be fastened to the upper flange 7 of the conveyor trolley beam 5 by suitable bolts or rivets as at 74 (Figure 10) so that the tripping frame may be easily removed and placed at any desired predetermined location. Each pair of side frame members 64 is further connected by a pair of guide strips 75 which are held in place by nuts and bolts as at 76 to engage the conveyor bucket supporting bails 32 during passage of the conveyor buckets through the tripping frame in much the same manner as the buckets are guided by the guide strip 54.

A tripping device 77 is located on each side of the conveyor pathway and is supported between the pairs of vertical frame members 64 as indicated in Figure 9. Each tripping device 77 is provided adjacent the ends thereof with wing extensions 78 having aligned apertures for being pivotally supported upon a rod 79 secured in place at its ends to the vertical frame member 64 by suitable nuts or the like as at 80. A tubular spacing rod 81 is mounted on the through rod 79 between the wing extensions 78, and similar tubular spacing rods 82 are disposed on opposite sides of the wing extensions 78 to retain the tripping device 77 in position and prevent longitudinal movement thereof. The ends of the tripping device 77 are provided with axle bolts 83 which are held in place by nuts or the like as at 84 for rotatably supporting tripping rollers 85 and 86 disposed in the path of the tripping flanges and wing extensions 45 and 46 respectively. With the tripping rollers 85 and 86 disposed as shown in Figures 9 and 10, the tripping flange 45 will first engage the tripping roller 85 and cause each conveyor bucket to be tilted as indicated in dotted lines in Figure 9. Upon continued conveyor travel, each bucket is tilted so that the upper edge of the leading wing extension 46 will engage the tripping roller 86 and thereby cause said bucket to be completely rotated about the pivotal axis thereof so that the contents will be dislodged and discharged from the buckets.

In order to retain the tripping rollers 85 and 86 out of the path of the tripping wings 45 and extensions 46, a manually controlled lever system is employed and includes a pair of vertical link members 87 having their lower ends pivotally connected as at 88 to the bifurcated ends of lever arms 89 secured to the tripping devices 77. The upper ends of the links 87 are connected to bellcranks 90 which are pivoted to suitable bracket supports 91 affixed to the upper side frame bar 65 by means of bolts or the like as at 92. A pivot bolt 93 is provided for pivotally attaching the bell-crank 90 to the supporting bracket 91. The other lever arms 94 of the bell-crank lever are connected to a pair of pivot links 95 by pivot pins 96, and said pivot links 95 extend inwardly in opposed relation for being connected to the opposite ends of a pivoted control lever 97. The pivoted control lever 97 is supported on a bracket 98 by means of a suitable pivot pin 99, and said control lever 97 has an end extension 100 for being connected with a control cable 101 which may pass over a pulley as at 102 supported by a suitable bracket arm 103. A pull handle 104 is attached to the free end of the control cable 101 for the purpose of operating the various links, bell-cranks and control levers so as to swing the tripping rollers 85 and 86 out of the path of abutting relationship with the tripping flanges and wings 45 and 46 respectively.

In the modified form of the invention shown in Figure 8, the conveyor trolley beam 5a is shown as being supported by vertical uprights 9a having transverse channel-beams 10a and 11a for supporting the upper and lower trolley beams or conveyor courses of a circuitous pathway. The ends of the trolley beams 5a are connected by an arcuately curved portion 12a to thereby complete a run-around conveyor circuit. A conveyor chain 15a is provided for driving the conveyor buckets and said conveyor chain is identical in construction to the conveyor chain 15 shown in Figures 1 to 7, 9 and 10. A series of trolley clips 28a are adapted to support the conveyor chain 15a and are arranged in equidistantly spaced relation one from the other in the same manner as the trolley clips 28 shown in Figures 1 to 7, 9 and 10. Trolley rollers 30a are carried by the trolley clips and said rollers are adapted to travel on opposite sides of the web of the trolley beam and be supported by the oppositely disposed flanges thereon. Arranged in spaced alternate relation with respect to the trolley clips 28a is a series of conveyor bucket supporting bails 32a and said bails are connected by angle brackets 33a to supporting trolley rollers 34a. The lower ends of the supporting bails 32a are pivotally attached to the conveyor buckets 37a, and bracing bails 51a extend between the buckets and the conveyor chain 15a in substantially the same manner as pointed out and described in connection with the form of the invention shown in Figures 1 to 7, 9 and 10.

It is to be noted that the conveyor buckets 37a travel in a circuitous conveyor pathway within the conveyor trolley beam 5a in distinction to the form shown in Figures 1 to 7, 9 and 10 wherein the buckets travel along a circuitous pathway externally of the trolley beam 5. When the conveyor buckets are thus supported, the upper conveyor run will be suspended beneath the trolley beam 5a and the buckets travelling along the lower run will be supported above the lower trolley beam of the conveyor system. During the travel of the buckets along the lower conveyor run, they are supported by guide strips 54a which are secured to the vertical uprights 9a and are disposed so as to engage the conveyor bucket bails 32a and 51a. The ends of the guide strips 54a are arcuately curved as at 55a for a portion of the return bend so as to prevent lateral swinging of the buckets during their travel along the lower conveyor course and until such time as the buckets have travelled a portion of the return bend and can be supported by suspension from the arcuately curved portion 12a of the conveyor trolley beam 5a. The arcuately curved end 12a of the conveyor trolley beam is further supported by suitable uprights 57a disposed on opposite sides of the conveyor pathway and connected by a transversely extending channel beam 58a having its ends connected to the upper end of the vertical standards 57a. Secured to the under side of the transversely extending channel beams 58a adjacent each end thereof is an angle bar 60a which extends longitudinally and has its ends connected to the free ends of the arcuately curved ends 55a of guide strips 54a.

In order to fill the buckets 37a, a discharge hopper is provided at one side of the conveyor pathway (not shown) and said discharge hopper is connected to a discharge trough 56a having a sloping bottom wall 59a and a discharge mouth 63a. A conveyor feed screw 62a is mounted in the feed trough for conveying material to be fed so that the material will pass downwardly along the sloping bottom wall 59a and flow through the discharge spout 63a into the conveyor bucket 37a.

As the conveyor buckets travel upwardly and are guided by the arcuately curved portion 55a of the guide strip, they are loaded and, as illustrated in dotted lines, the material flow will always pass into a bucket presented beneath the discharge mouth. This construction provides for a continuous feeding of the conveyor bucket 37 and eliminates the use of various hopper valves and gates for controlling the discharge of material flow from the feed trough to the conveyor buckets.

In both forms of the invention, the conveyor buckets 37 and 37a may be propelled about their circuitous conveyor pathway by a sprocket wheel constructed and positioned so as to drivingly engage the conveyor trolley chain links 15 or 15a on one or both sides thereof in a manner well known in the art.

As shown in Figures 11 and 12, a combined guide and take-up disc 14b is located at a horizontal bend in the conveyor pathway to guide the conveyor buckets during their circuitous travel in a horizontal plane and prevent the buckets from swinging inward toward the center of the return bend. The guide discs may be applied to the type of bucket conveyor shown in both forms of the invention (Figures 1 to 7 and 8).

The reference character 5b in Figures 11 and 12 will generally indicate a conveyor trolley beam of I-shaped cross-section similar to the trolley beam in Figures 1 to 10, and may constitute the ends of the trolley beam shown in these figures arranged or disposed in a horizontal plane. A reverse bend 6b is positioned adjacent said ends and arranged in a horizontal plane to form a continuous conveyor trackway. The adjoining ends of the trolley beam may be scarfed to provide overlapping portions. Supported on the reverse bend 6b of the I-shaped trolley beam 5b is a pair of transversely arranged channel beams 8b which are connected by a pair of similar beam members 9b. An adjustable platform 10b is fastened to the beam members 9b by means of anchoring screws 11b or the like being passed through apertures so as to securely fasten said platform in place.

Secured to the under side of the adjustable platform 10b is a tubular bearing member 13b for rotatably supporting a guide disc 14b. A shaft pin 15b is anchored in the tubular bearing member to support the guide disc and permit free rotation thereof. Scarf plates 18b are disposed beneath the joint of the trolley beams 5b and 6b to guide the trolley rollers over said joint and prevent disengagement thereof.

As will be noted in Figure 12, the guide disc 14b is positioned and arranged so that the peripheral edge thereof as at 16b will engage the bails 32 of the conveyor buckets as they pass therearound. The conveyor structure is identical in form to the conveyor bucket assembly illustrated and described in detail in connection with Figures 1 to 7 inclusive. When the horizontal bend shown in Figures 11 and 12 is employed in the conveyor structure shown in Figures 1 to 7 and 8, the platform 10b may be reversed from the position shown in Figures 11 and 12 for guiding the conveyor buckets 37 and 37a around the horizontal curves in the upper and lower courses thereof, respectively. The horizontal return bend may be supported from overhead structural elements in such a manner as to be movable toward and away from the ends of the trolley beam 5b so that the slack in the conveyor chain may be easily taken up.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position.

2. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, said trolley members being of U-shaped form with the free ends pivoted to opposite sides of the conveyor buckets.

3. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, said trolley members being constructed of U-shaped members, and said bracing structures including U-shaped bail members with their free ends pivotally affixed to the conveyor buckets.

4. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, bracing structures connecting the outer portions of said trolley members with said flexible conveyor member at locations spaced longitudinally therealong from said trolley members for retaining said conveyor buckets in an extended position, extensions formed on the endless flexible conveyor member for affixing said bracing structures, and a pivot rod extending through each conveyor bucket having its ends secured to said trolley members and bracing structures.

5. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, said endless flexible conveyor member being constructed of link members pivoted together on mutually perpendicular successive pivot axes whereby to permit flexing in directions at right angles to one another.

6. A trolley conveyor, comprising a conveyor supporting structure including a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, a tripping projection mounted on each conveyor bucket, and a pair of tripping abutments mounted on said conveyor supporting structure, said abutments being disposed in succession along said pathway and successively engageable with said tripping projections whereby one abutment partially overturns each bucket and the succeeding abutment continues the overturning thereof.

7. A trolley conveyor, comprising a conveyor supporting structure including a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, a tripping projection mounted on each conveyor bucket, a pair of tripping abutments movably mounted on said conveyor supporting structure, said abutments being disposed in succession along said pathway for successive engagement by each tripping projection and movable into and out of the path of said tripping projections, and selectively operable abutment-shifting mechanism mounted on said structure and operatively connected to said tripping abutment for selectively moving said tripping abutments into and out of their projection engaging positions.

8. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, bracing structures connecting the outer portions of said trolley members with said flexible conveyor member at locations spaced longitudinally therealong from said trolley members for retaining said conveyor buckets in an extended position, a supporting rod extending through each conveyor bucket having its ends secured to the trolley members, and a tubular guard rod surrounding said supporting rod with its ends secured to the side walls of said buckets whereby to prevent material being conveyed from damaging the bearing surfaces of said rod through abrasive action.

9. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members, for retaining said conveyor buckets in an extended position, said endless flexible member being formed of pivoted link members having extensions thereon for securing said bracing structures thereto.

10. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, said endless flexible conveyor member being formed of links pivoted together by link pins with certain of said link pins passing through the trolley members for providing a pivotal connection therewith.

11. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, bracing structures connecting the outer portions of said trolley members with said flexible conveyor member at locations spaced longitudinally therealong from said trolley members for retaining said conveyor buckets in an extended position, said endless flexible conveyor member being formed of links pivoted together by link pins with certain of said link pins passing through the trolley members for providing a pivotal connection therewith, and trolley clips interposed between said trolley members for supporting the endless flexible conveyor member from said trolley beam at spaced intervals therealong.

12. A trolley conveyor comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, each bracing structure forming with its respective trolley member a substantially triangular rigid frame.

13. A trolley conveyor, comprising a trolley beam having flanges and arranged to provide an endless circuitous conveyor pathway, trolley members movable along said pathway supported by said trolley beam, trolley rollers mounted on said trolley members for engaging the flanges of the trolley beam, conveyor buckets pivotally attached to the trolley members to move along said conveyor pathway, a flexible endless conveyor member connecting each of the trolley members, and bracing structures connecting the outer portions of said trolley members with said flexible conveyor member at locations spaced longitudinally therealong from said trolley members for retaining said conveyor buckets in an extended position, each bracing structure forming with its respective trolley member a substantially triangular rigid frame having a portion thereof extending along said conveyor member and connected thereto at a location intermediate the ends of said frame portion.

HENRY W. HAPMAN.

REFERENCES CITED

The following references are of record in the file of this patent:

UNITED STATES PATENTS

| Number | Name | Date |
| --- | --- | --- |
| 269,295 | Kirby | Dec. 19, 1882 |
| 299,393 | Jenkins | May 27, 1884 |
| 387,649 | Lockwood | Aug. 14, 1888 |
| 402,160 | Hogeland | Apr. 30, 1889 |
| 432,915 | Toohey | July 22, 1890 |
| 465,198 | Patterson et al. | Dec. 15, 1891 |
| 672,953 | Moldenhauer | Apr. 30, 1901 |
| 730,539 | Joor | June 9, 1903 |
| 1,015,570 | Locke | Jan. 23, 1912 |
| 1,048,834 | Hunt | Dec. 31, 1912 |
| 1,949,691 | Neher et al. | Mar. 6, 1934 |
| 2,133,391 | Lemmon | Oct. 18, 1938 |
| 2,280,941 | Adams | Apr. 28, 1942 |